United States Patent
Lu et al.

(10) Patent No.: US 9,137,083 B1
(45) Date of Patent: Sep. 15, 2015

(54) SYNCHRONIZATION AND FREQUENCY CORRECTION FOR A RECEIVER

(71) Applicants: Sili Lu, Austin, TX (US); Leo G. Dehner, Austin, TX (US)

(72) Inventors: Sili Lu, Austin, TX (US); Leo G. Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/255,265

(22) Filed: Apr. 17, 2014

(51) Int. Cl.
*H04L 27/06* (2006.01)
*H04L 27/26* (2006.01)

(52) U.S. Cl.
CPC .................................. *H04L 27/2663* (2013.01)

(58) Field of Classification Search
CPC .................................................... H04L 27/2663
USPC .......................................................... 375/260
See application file for complete search history.

(56) References Cited

U.S. PATENT DOCUMENTS

| | | | |
|---|---|---|---|
| 7,933,367 B2 | 4/2011 | Kroeger et al. | |
| 2001/0050926 A1* | 12/2001 | Kumar | 370/529 |
| 2006/0088133 A1* | 4/2006 | Chen et al. | 375/343 |
| 2009/0219882 A1* | 9/2009 | Kim et al. | 370/330 |
| 2010/0303183 A1* | 12/2010 | Desai | 375/350 |
| 2011/0285585 A1* | 11/2011 | Bergamo | 342/357.31 |
| 2011/0305178 A1* | 12/2011 | Zheng et al. | 370/311 |
| 2012/0269124 A1* | 10/2012 | Porat | 370/328 |

OTHER PUBLICATIONS

Ibiquity Digital Corporation, "HD Radio Air Interface Design Description Layer 1 FM," Rev. G; iBiquity Digital Corporation, Columbia, MD.; Doc. No. SS_IDD_1011s; Aug. 23, 2011; 133 pages.
Ibiquity Digital Corporation, "HD Radio FM Transmission System Specifications," Rev. E; iBiquity Digital Corporation, Columbia, MD.; Doc. No. SY_SSS_1026s; Jan. 30, 2008; 14 pages.

* cited by examiner

*Primary Examiner* — Erin File

(57) ABSTRACT

A receiver and a method for providing block synchronization of symbols and integral frequency offset correction of subcarriers are provided. Samples of a received signal are transformed into the frequency domain. Subcarrier extraction is performed to extract selected subcarriers. The extracted subcarriers are differentially demodulated using subcarriers from the previous symbol and coherently combined with reference subcarrier values to obtain sample vectors. The sample vectors are obtained over a number of symbols preferably equal to the number symbols in a block. Cyclic correlation is performed on those sample vectors relative to a known synchronization (sync) pattern. A maximum magnitude search is performed over sample vectors obtained from the cyclic correlation to determine an integral frequency offset and a block boundary of the received signal. The integral frequency offset and the block boundary can be used to tune and synchronize the receiver for proper reception of the received signal.

20 Claims, 7 Drawing Sheets

SYNCHRONIZATION AND FREQUENCY CORRECTION FOR A RECEIVER

BACKGROUND

1. Field of the Disclosure

This disclosure relates generally to the processing of modulated signals, and more specifically, to synchronization and tuning of receivers.

2. Description of the Related Art

In a frequency division multiplexed (FDM) communication system, a modulated signal can communicate a stream of digital information. At any given time, portions of the digital information being communicated are carried over several carriers. Each carrier has its own frequency. Each carrier can be subcarrier. Each one of the subcarriers is modulated to convey a symbol. Each of those symbols spans a period of time called a symbol interval. The symbols transmitted over successive symbol intervals change to represent the stream of digital information over time.

Symbol intervals are grouped in blocks of symbol intervals. Each block has a particular number of symbol intervals, including an initial symbol interval. A radio receiver needs to be synchronized to such blocks in addition to being synchronized to the individual symbol intervals.

A radio receiver also needs to be tuned to the frequencies of the subcarriers. A frequency offset may exist between the frequency on which the transmitter is transmitting each of the subcarriers and the frequency on which the receiver is attempting to receive each of the subcarriers. If the frequency offset is greater than the frequency difference between subcarrier frequencies, tuning the receiver to the nearest subcarrier frequency may tune the receiver to the wrong subcarrier frequencies. Thus, a radio receiver needs to be capable of tuning to an integral frequency offset and a fractional frequency offset. The integral frequency offset is an integer number of multiples of subcarrier-to-subcarrier frequency spacing. The fractional frequency offset is a frequency offset of less than the subcarrier-to-subcarrier frequency spacing.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
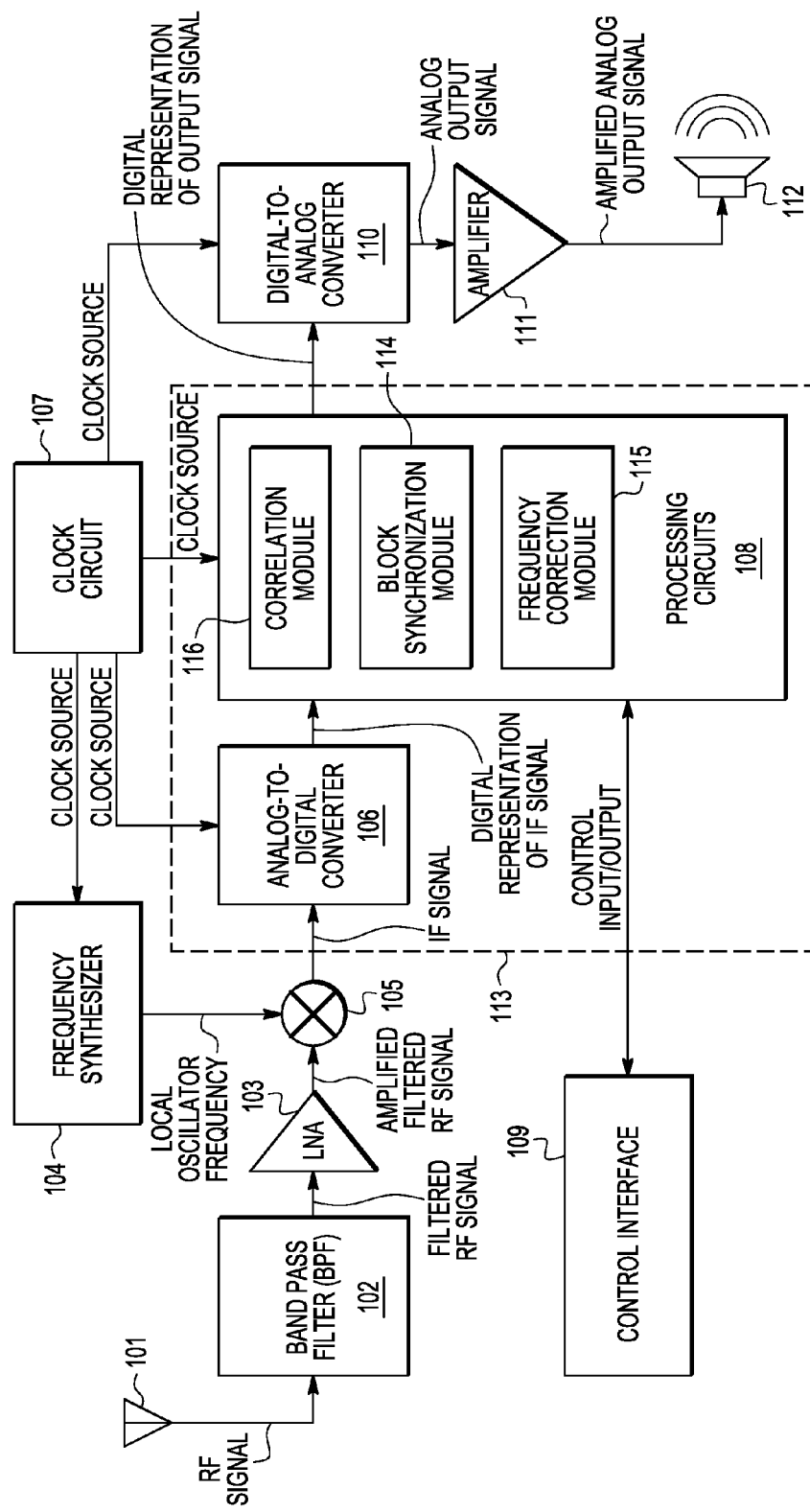
FIG. 1 is a block diagram illustrating a receiver in accordance with one embodiment.

A receiver and a method for providing block synchronization of symbol intervals and integral frequency offset correction of subcarriers of a received modulated signal are disclosed. Sample vectors are obtained over several symbol intervals for several subcarriers proximate to a reference subcarrier. Cyclic correlation is performed on the sample vectors relative to a known reference data pattern. The known reference pattern can be a synchronization pattern. The cyclic correlation measures how closely the sample vectors match the known reference data pattern. A maximum magnitude search is performed to identify the correlation value having the highest magnitude. The correlation value having the highest magnitude corresponds to the sample vector that most closely matches the reference data pattern. The block synchronization and integral frequency offset correction value corresponding to the sample vector having the highest magnitude correlation value are selected for use. The receiver synchronizes to blocks of symbol intervals using the selected block synchronization. The receiver tunes to the proper subcarriers using the selected integral frequency offset correction value. Accordingly, the receiver can properly receive the desired signal.

The integral frequency offset correction can be provided with respect to subcarrier spacing of adjacent subcarriers. Based upon a particular communication protocol, the received signal has a total defined number of carriers and a block size having a total defined number of symbol intervals. The protocol further defines one or more of the subcarriers to be reference subcarriers, also referred to as reference channels, over which various types of reference information can be transmitted. The reference information conveyed over a reference channel can include subcarrier-specific information, block specific information, and other types of information that can be variable or fixed. For a particular reference channel of a transmitted block, each one of the symbol intervals of the block conveys a symbol vector that corresponds to one bit of the reference information conveyed by that block. According to the protocol, a defined portion of each reference channel's reference information has a fixed value, referred to as a block synchronization pattern, that can be used to implement block synchronization, e.g. to determine the first symbol interval of each block.

During a synchronization/tuning operation, samples are taken of the received signal. The samples are transformed from the time domain into the frequency domain. Subcarrier extraction is performed to extract selected subcarriers from the frequency domain representations of the samples. For example, subcarriers are extracted that are expected to be reference subcarriers or that are adjacent to expected reference subcarriers. The extracted subcarriers are differentially demodulated using subcarrier information from the previous symbol interval to obtain symbol vectors that convey digital information. The symbol vectors for each extracted carrier are obtained over a number of symbol intervals preferably equal to the number symbol intervals in a block. By way of example, it is presumed that the total defined number of carriers is 1093 (subcarrier[−546] through subcarrier[+546]) and the total defined number of symbol intervals is 32 per block. Other embodiments may be applied to protocols with other numbers of carriers and other numbers of symbol intervals per block. For example, the subcarrier extraction can be performed to extract k+1 carriers from each one of 32 sequential symbol intervals, wherein the k+1 intervals are centered around a subcarrier[m], where m is a nominal subcarrier index of the received signal that corresponds to a reference carrier when the receiver is properly tuned and synchronized. Thus, (2k+1)*32 sample vectors are obtained, each one conveying a symbol.

A cyclic correlation is performed between the (2k+1)*32 sample vectors and the block synchronization (sync) pattern to determine a symbol interval that is likely to be the first symbol interval of a block. For example, each of the possible locations of the (2k+1)*32 sample vectors that can include the block sync pattern is correlated to the block sync pattern to determine a correlation value. When completed, a maximum magnitude search is performed to determine the block boundary, which can be the location providing the highest amount of correlation based upon the cyclic correlation, and to determine whether the tuned receiver is actually tuned properly to a desired (expected) subcarrier or is subject to an integral frequency offset characterized by the receiver being improperly tuned to a subcarrier other than the desired subcarrier, such as to a subcarrier that is nearby the expected subcarrier. The integral frequency offset and the block boundary information can be used to tune and synchronize the receiver for proper reception of the received signal.

FIG. 1 is a block diagram illustrating a receiver system 100 in accordance with one embodiment. The receiver system 100 can include antenna 101, band pass filter (BPF) 102, low noise amplifier (LNA) 103, frequency synthesizer 104, mixer 105, clock circuit 107, receiver 113, control interface 109, digital-to-analog converter (DAC) 110, amplifier 111, speaker 112, combinations thereof, and the like. Receiver 113 can include analog-to-digital converter (ADC) 106 and processing circuits 108.

Antenna 101 is coupled to BPF 102. Antenna 101 provides a radio frequency (RF) signal to BPF 102. BPF 102 is coupled to LNA 103. BFP 102 filters the RF signal from antenna 101 and provides a filtered RF signal to LNA 103. LNA 103 is coupled to mixer 105. LNA 103 amplifies the filtered RF signal from BFP 102 and provides an amplified filtered RF signal to mixer 105. Clock circuit 107 is coupled to and provides a clock source to frequency synthesizer 104, to ADC 106, to processing circuits 108, and to DAC 110. Frequency synthesizer 104 provides a local oscillator (LO) frequency to mixer 105. Mixer 105 mixes the LO frequency from frequency synthesizer 104 with the amplified filtered RF signal from LNA 103 to produce an intermediate frequency (IF) signal. Mixer 105 is coupled to ADC 106 and provides the IF signal to ADC 106. ADC 106 converts the IF signal to a digital representation of the IF signal. ADC 106 is coupled to processing circuits 108 and provides the digital representation of the IF signal to processing circuits 108.

Processing circuits 108 process the digital representation of the IF signal, for example demodulating an information signal corresponding to a modulated information signal on the RF signal. The information signal processed by processing circuits 108 can be, for example, a baseband information signal or a near-zero-IF information signal, depending on the relationships of the amplified filtered RF signal, the LO frequency and the IF signal. Demodulation of the information signal can include processing the information signal according to its subcarriers (in frequency) and its symbols (in time) to recover the information of the information symbol and to provide a digital representation of an output signal based on such information. Processing circuits 108 are coupled to a control interface 109, which can receive control input or provide control output, for example, displaying information about the operation of processing circuits 108.

If the digital information received from the processed stream is audio data, the processing circuits 108 can be coupled to DAC 110 and provide the digital representation of the output signal to DAC 110. DAC 110 converts the digital representation of the output signal to an analog output signal. DAC 110 is coupled to amplifier 111 and provides the analog output signal to amplifier 111. Amplifier 111 amplifies the analog output signal. Amplifier 111 is coupled to speaker 111 and provides the amplified analog output signal to speaker 112. Speaker 112 is a transducer that converts the amplified analog output signal from an electrical form to an acoustic form.

The digital representation of the output signal is not limited to output signals of an acoustic nature. The digital representation of the output signal can represent other types of output signals or a combination of types of output signals which can, but need not, include an output signal of an acoustic nature. In some embodiments, the digital representation of the output signal includes non-acoustic information. An example of such an embodiment is used to provide digital data communication, for example, radio data system (RDS) digital data communication. RDS digital data can include, for example, station identification of a station transmitting the received RF signal. The portion of the digital representation of the output signal pertaining to the RDS digital data can, for example, be displayed on control interface 109. The portion of the digital representation of the output signal pertaining to an acoustic output signal can be provided to DAC 110.

Processing circuits 108 can be a general-purpose instruction-based processor or specialized processor, such as an instruction based digital signal processor (DSP), a state machine, or other type of logic circuits capable of performing operations on data. In the embodiment shown, processing circuits 108 include memory. The memory stores a variety of information, such as for example: instructions to cause processing circuits 108 to perform a specific operation; parameter values to be used to configure the operation of processing circuits 108; data to be used by processing circuits 108, such as a digital representation of an IF signal from DAC 106; and, data to be output from processing circuits 108, such as a digital representation of an information signal to be provided to DAC 110. Thus, the circuits of FIG. 1 can be implemented, for example, by non-instruction-based digital logic, or, for example, by a processor, such as a general-purpose processor or a digital signal processor (DSP), executing instructions to perform the functions of the circuits.

As shall be described in greater detail with reference to specific examples below, processing circuits 108 can include a correlation module 116, a block synchronization module 114, and a frequency correction module 115. Correlation module 116 can perform correlation of received bit patterns to expected bit patterns to produce correlation values. Higher correlation values represent better correlation (e.g., a closer match) between the received bit patterns and the expected bit patterns. Block sync module 114 can provide block synchronization of a received orthogonal-frequency-division-multiplexed (OFDM) signal by identifying a block boundary of a data block based on the correlation values. Frequency correction module 115 can determine an integral frequency offset value of the received OFDM signal based on the correlation values. The integral frequency offset value can be used to tune a receiver to receive the received OFDM signal according to the correlation.

Processing circuits 108 can be configured to perform a maximum magnitude search on the correlation values resulting from a cyclic correlation to determine the integral frequency offset value and to identify the block boundary of the data block of the received OFDM signal according to the maximum magnitude search. The subcarriers of the received OFDM signal can be assigned indices by processing system 108 to correlate each subcarrier with a corresponding expected subcarrier index, wherein each subcarrier index corresponds to a relative nominal frequency within the portion of the spectrum occupied by the OFDM signal. As an example, some subcarrier indices can correspond to reference subcarriers that convey symbols that represent reference data to aid in demodulation (and perhaps other data, such as user data), while other subcarrier indices can correspond to data subcarriers that convey symbols that do not represent such reference data (e.g., they can represent user data, other types of data, the like, or combinations thereof). By selecting a range of subcarrier indices centered around a particular expected subcarrier index, which is believed to correspond to a desired subcarrier index, a cyclic correlation can to be performed by processing circuits 108 on the range of subcarrier indices to determine if the expected subcarrier is the desired subcarrier, or a non-desired subcarrier that is within the range being evaluated. By anticipating the possibility of frequency offsets that can be equal to or greater than the difference in frequency of two adjacent subcarriers, where such a frequency offset can be referred to as an integral frequency offset since the frequency offset is a multiple of such difference in frequency, the cyclic correlation can be used to tune the receiver to the proper integral frequency.

To select the range of subcarrier indices to be evaluated, processing circuits 108 can be configured to select multiple ranges of the subcarrier indices for multiple specified reference subcarrier indices. For example, processing circuit 108 can be configured to select ranges of −546±1, −527±1, +527±1, and +546±1 for specified reference subcarrier indices of −546, −527, +527, and +546. For an exemplary protocol having 32 symbol intervals per block, the correlation can be obtained by performing a cyclic correlation of vectors obtained from 32 symbols of the received OFDM signal for each of the subcarrier indices in the range of the subcarrier indices.

Figure 2:
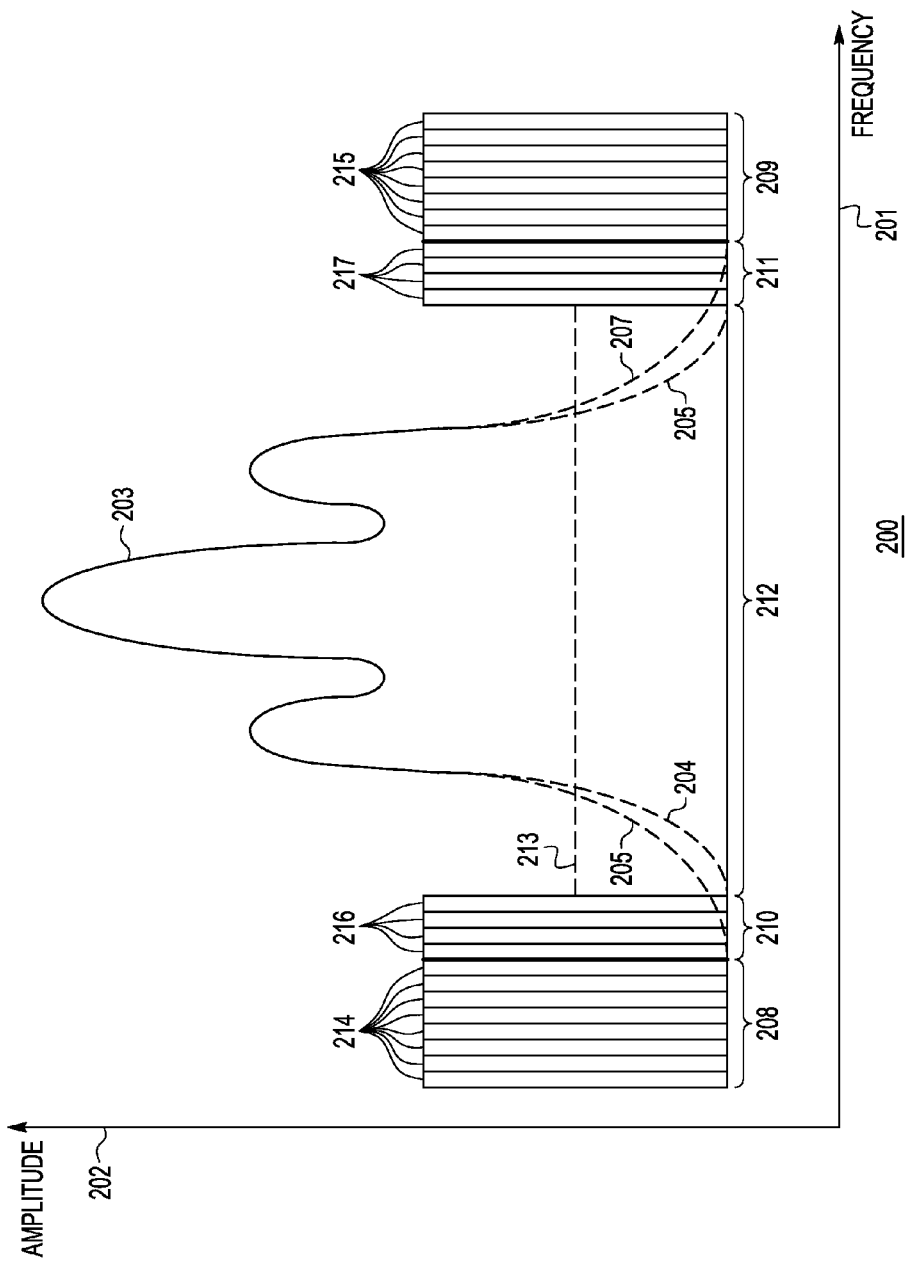
FIG. 2 is a spectral plot diagram illustrating, in the frequency domain, a signal comprising subcarriers for communicating digital information in accordance with one embodiment.

FIG. 2 is a spectral plot diagram illustrating, in the frequency domain, a signal comprising subcarriers for communicating digital information in accordance with one embodiment. A receiver such as that shown in FIG. 1 can be used, for example, to receive one or more signals such as those shown in spectral plot 200 of FIG. 2. The spectral plot 200 is plotted with respect to a frequency axis 201 and an amplitude axis 202. The spectral plot shows a signal that is transmitted over a RF channel that includes transmission of an analog signal 203 and transmission of digital sidebands 208, 210, 211, and 209 relative in this example to a centrally located signal, such as the analog signal 203. The analog signal 203 can, for example, be a frequency modulated (FM) analog signal. The digital sidebands can, for example, include a primary digital lower sideband (LSB) 208, a primary digital upper sideband (USB) 209, a secondary digital LSB 210, and a secondary digital USB 211. If secondary digital LSB 210 and secondary digital USB 211 are not used, analog signal 203 can have a bandwidth that conforms to skirts 206 and 207. If secondary digital LSB 210 and secondary digital USB 211 are used, analog signal 203 can have an analog signal bandwidth 212 that conforms to skirts 204 and 205. Primary digital LSB 208 can include subcarriers 214, primary digital USB 209 can include subcarriers 215, secondary digital LSB 210 can include subcarriers 216, and secondary digital USB 211 can include subcarriers 217. As an example, digital sidebands 208, 210, 211, and 209 can be used to communicate digital information, which can include digital audio information, and analog signal 203 can be used to communicate an analog audio signal, which can, for example, be received by receivers unable to receive digital audio information. Thus, as an example, analog signal 203 can be ignored by a receiver capable of receiving digital audio information.

In the event the channel illustrated at FIG. 2 does not need to transmit an analog signal 203, a tertiary digital signal 213, which can span the spectrum between secondary digital LSB 210 and secondary digital USB 211, can be included instead of analog signal 203. Tertiary digital signal 213 can include a plurality of subcarriers for the communication of digital information.

Figure 3:
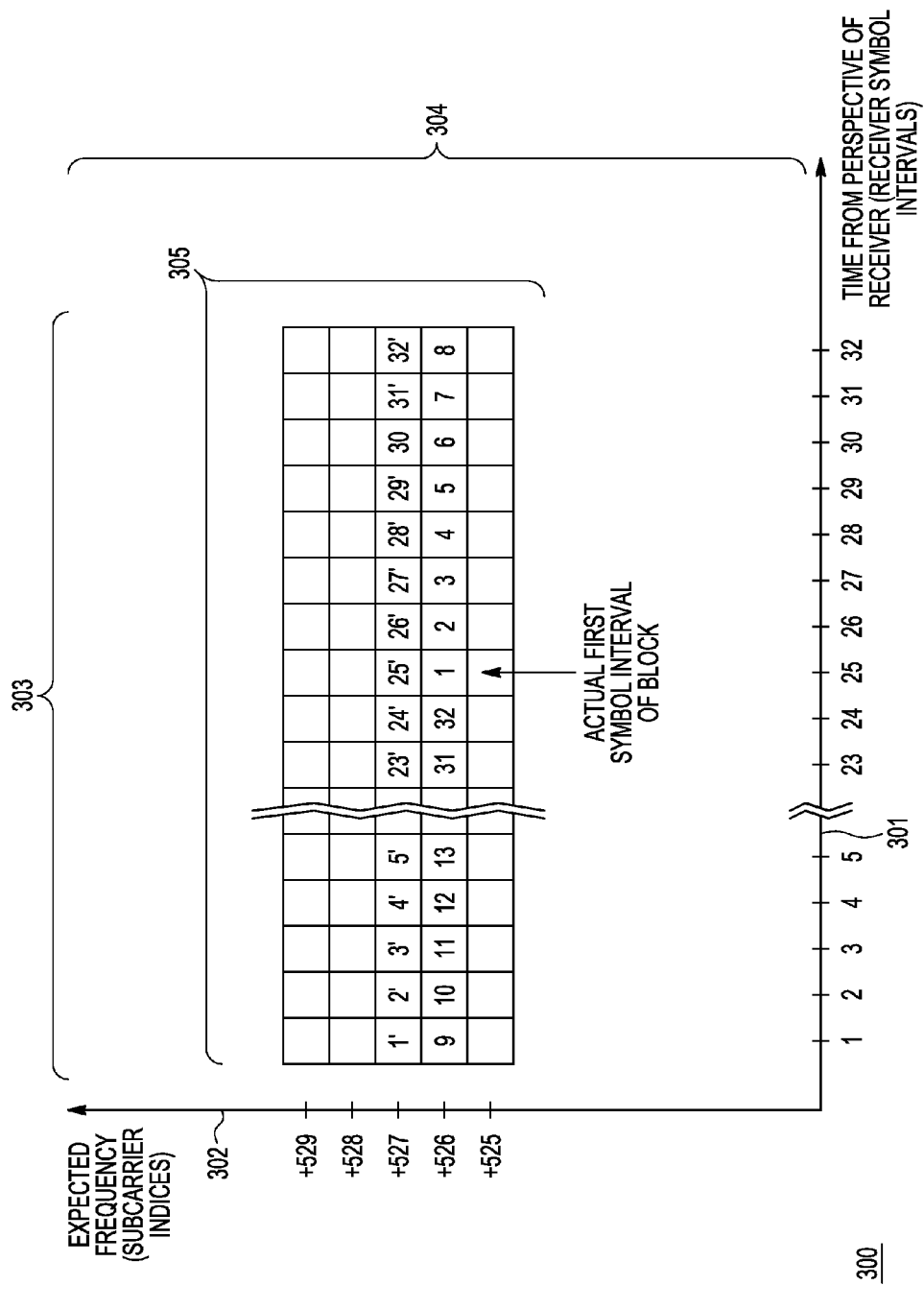
FIG. 3 is a diagram illustrating, in time and frequency, a search range within which a receiver searches for a control sequence in a received signal in accordance with one embodiment.

FIG. 3 is a diagram 300 illustrating, in time and frequency, a search range 305 within which a receiver searches for a control sequence in a received signal in accordance with one embodiment. While FIG. 2 shows an exemplary received signal at a particular point in time plotted in frequency and amplitude, FIG. 3 shows a range of symbol intervals in time for a few subcarriers in frequency. For example, multiple subcarriers 304 of FIG. 3 may depict a portion of the subcarriers 215 of primary digital USB 209 of FIG. 2.

The data provided by a portion of any of primary digital lower sideband (LSB) 208, primary digital upper sideband (USB) 209, secondary digital LSB 210, secondary digital USB 211, and tertiary digital signal 213 can be organized according to a grid illustrated with respect to time axis 301 and frequency axis 302. Time axis 301 represents time from the perspective of the receiver (in receiver symbol intervals). Frequency axis 302 represents expected frequency (in the form of subcarrier indices of the receiver). Multiple subcarriers 304 span a range of frequencies. Each one of multiple subcarriers 304 is used to communicate multiple symbols 303 over time. Note that, for clarity, not all of the span of receiver symbol intervals from 1 to 32 is shown along time axis 301. Therefore, not all of search range 305 is illustrated, but time axis 301 and search range 305 should be understood to span the ranges indicated by the numbering shown. Each column in the diagram corresponds to a single symbol interval that includes multiple subcarriers 304 along frequency axis 301, and each row in the diagram corresponds to a plurality of symbol intervals for a single subcarrier. Thus, each location of the grid of FIG. 3 corresponds to the transmission of a single symbol of a particular subcarrier during a particular symbol interval.

Within search range 305, control sequences having synchronization bits can be present at pre-determined locations in frequency and time. For example, eleven bits of a 32 bit sequence of control data can provide a predefined synchronization pattern for each block. By comparing a pattern of expected synchronization bit values to the pattern of received bit values received at locations in frequency and time from the perspective of the receiver, the receiver can determine a correlation value for the pattern of received bit values with respect to each presumptive set of locations in frequency and time. By shifting by various amounts in frequency and time, from the perspective of the receiver, the pattern of received bit values, a correlation value can be determined for each of the shifted patterns. Since block boundaries occur periodically in time, correlation values tend to be cyclical with respect to the period corresponding to the number of symbol intervals in a block. A correct frequency offset value aligns the subcarriers of the received signal with their expected subcarrier indices from the receiver's perspective. A correct symbol interval offset value aligns the symbols with their expected block boundaries from the receiver's perspective. With the correct frequency offset value and the correct symbol interval offset value, a correlation value is obtained that is likely much greater than the correlation values obtained for amounts of shifting in frequency and time that do not properly align the pattern of received bit values with the expected subcarrier indices and the expected block boundaries. By performing a maximum magnitude search on the cyclic correlation values resulting from the cyclic correlation to identify the correlation value having the highest magnitude, cyclic correlation and a maximum magnitude search can simultaneously identify the correct integral frequency offset value and the correct block boundary of the received signal.

By detecting the presence or absence of such control sequences at such locations using pre-determined patterns of the synchronization bits included within the control sequences, frequency offset determination and synchronization of a receiver can be performed. As an example, an orthogonal-frequency-division-multiplexed (OFDM) radio broadcasting system can use a 32-bit control data sequence that includes 11 synchronization bits. The synchronization bits need not be sequential and contiguous within the 32-bit control data structure. For example, the first seven bits, as well as the tenth bit, the fifteenth bit, and the twenty-second and twenty-third bits from one end of the control data sequence can be used as synchronization bits. For example, the first seven bits can have a pre-determined binary pattern, such as 0110010. The other bits can also have pre-determined binary values or patterns. As depicted in the diagram of FIG. 3, a block is understood to be a number of symbols spanning a number of symbol intervals with respect to time axis 301 wherein control sequences occur in the same respective locations of the diagram for each block.

Since there is no guarantee that bits will be received correctly, and some of the bits, which can include some of the synchronization bits, can have erroneous values as received, a correlation, such as a cyclic correlation, can be performed to provide a metric for determining how closely the received bits match their expected values. By performing such correlations over several subcarriers (in frequency) and several symbols (in time), a most likely candidate for the synchronization bit pattern can be identified even if the timing of the symbols is not known a priori and even if the frequency offset exceeds the difference in frequency between two adjacent subcarriers.

Without a priori knowledge of timing, for synchronization patterns that repeat every 32 symbols, any of the symbols could contain the synchronization bits being sought, so the search can continue through at least the full range of 32 symbols to assure that the search is not prematurely concluded. However, if a particularly high level of correlation (e.g., greater than a threshold) is found before the search through the full range, the search can be concluded without searching the rest of the range, provided the confidence attributable to the candidate is sufficient to preclude finding another more likely candidate in the remaining portion of the range.

As shown in FIG. 3, if the actual first symbol interval of a block occurs in what the receiver deems to be the $25^{th}$ symbol interval from the receiver's perspective and the reference subcarrier having the subcarrier index +527 is received at a frequency which the receiver deems to correspond to subcarrier index +526, the cyclical ordinal symbol interval numbers will appear in the search range 305 as indicated by the numbers (without the prime mark) 9 through 13 and 31 through 32 then 1 through 8 at subcarrier index +526. Cyclic correlation is performed to identify the correct integral frequency offset value and the correct symbol interval block boundary. The correct symbol interval block boundary may be denoted by an amount by which the received symbol intervals can be shifted in time to align with the units of time axis 301. By utilizing the correct integral frequency offset value and the correct symbol interval block boundary, the control sequence indicated by the numbers 1' through 5' and 23' through 32' at subcarrier index +527 can be obtained. The correct alignment of the control sequence on the reference subcarrier also provides the correct alignment of the data communicated via all of the subcarriers of the received signal. Therefore, proper reception of the received signal is provided.

Figure 4:
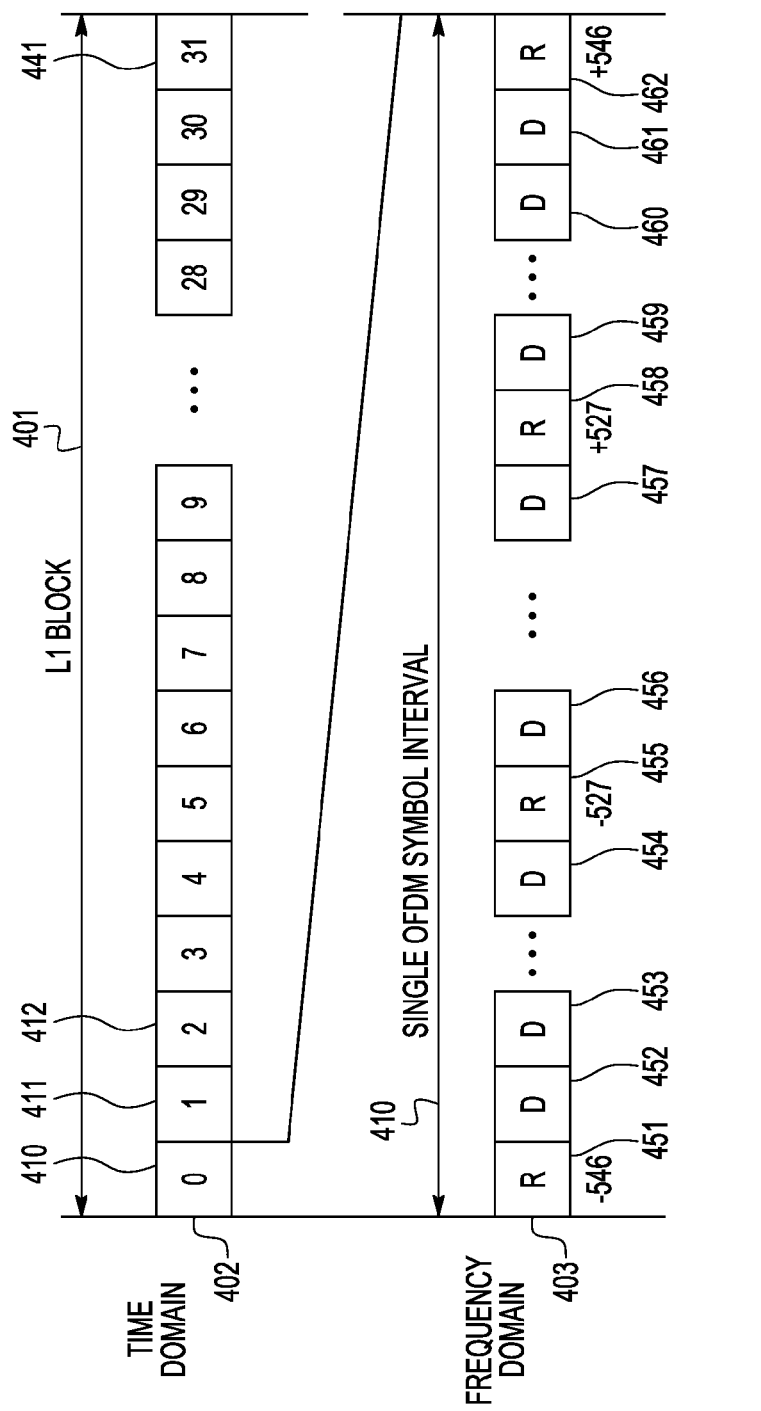
FIG. 4 is a diagram illustrating, in the time domain and the frequency domain, a data block comprising symbols in accordance with one embodiment.

FIG. 4 is a diagram illustrating, in the time domain and the frequency domain, a data block 401 comprising symbols in accordance with one embodiment. Drawing 400 includes time domain portion 402 and frequency domain portion 403. Time domain portion 402 illustrates L1 data block 401. In the example shown, L1 data block 401 can include 32 symbol intervals 410, 411, 412, through 441 arranged in sequential order. As an example, search range 305 of FIG. 3 can represent a subset of data block 401 of FIG. 4.

Frequency domain portion 403 illustrates a single OFDM symbol interval 410 of L1 data block 401. As viewed in the frequency domain, single OFDM symbol interval 410 can include information conveyed during a single symbol interval by a plurality of subcarriers. Such subcarriers can include reference subcarriers 451, 455, 458, and 462 and data subcarriers 452, 453, 454, 456, 457, 459, 460, and 461. The illustrated subcarriers exist among many other subcarriers, as indicated by ellipses and as can be seen by the subcarrier indices −546, −527, +527, and +546, which denote the positions of the reference subcarriers among the other subcarriers. By way of example, it is presumed that the total defined number of subcarriers is 1093 (e.g., subcarrier[−546] through subcarrier [+546]) and the total defined number of symbol intervals is 32 per block. In this example, it is presumed that the reference information conveyed over each reference subcarrier of a transmitted block is a 32-bit control word.

A symbol is communicated for each of reference subcarriers 451, 455, 458, and 462 and data subcarriers 452, 453, 454, 456, 457, 459, 460, and 461 during single OFDM symbol interval 410. Each of these symbols communicates a portion of the set of digital information being communicated during the symbol interval. Subcarriers can be modulated to implement various modulation schemes to convey one or more bits of information per symbol.

Block synchronization and integral frequency offset value determination are obtained by locating the sync bits of the control word. Correlation values for candidate combinations of symbol interval block boundaries and integral frequency offset values will show a peak value for the correct combination of symbol interval block boundary and integral frequency offset value. A maximum magnitude search can identify the peak value.

A search is performed over, for example, reference subcarrier 451 and data subcarriers 452 and 453 without a priori knowledge as to whether they are reference subcarriers or data subcarriers. The bits at the positions where synchronization bits would be expected would be expected to show better correlation to the expected synchronization bit values for reference subcarrier 451 than for data subcarriers 452 and 453. It is possible that the receiver is initially mistuned such that data subcarrier 452 appears to be at the subcarrier index (e.g., subcarrier[−546]) at which reference subcarrier 451 is expected to be. However, in such case, the respective bit values of reference subcarrier 451 correlate better to the expected synchronization bit values, as compared to the poorer correlation of the respective bit values of data subcarrier 452 to the expected synchronization bit values. The difference in correlation values allows identification of reference subcarrier 451 as actually being the desired reference subcarrier. Accordingly, the frequency offset can be determined and the receiver can be retuned. Retuning may be accomplished by correcting the values of the subcarrier indices to reflect the actual subcarriers of the received signal.

Figure 5:
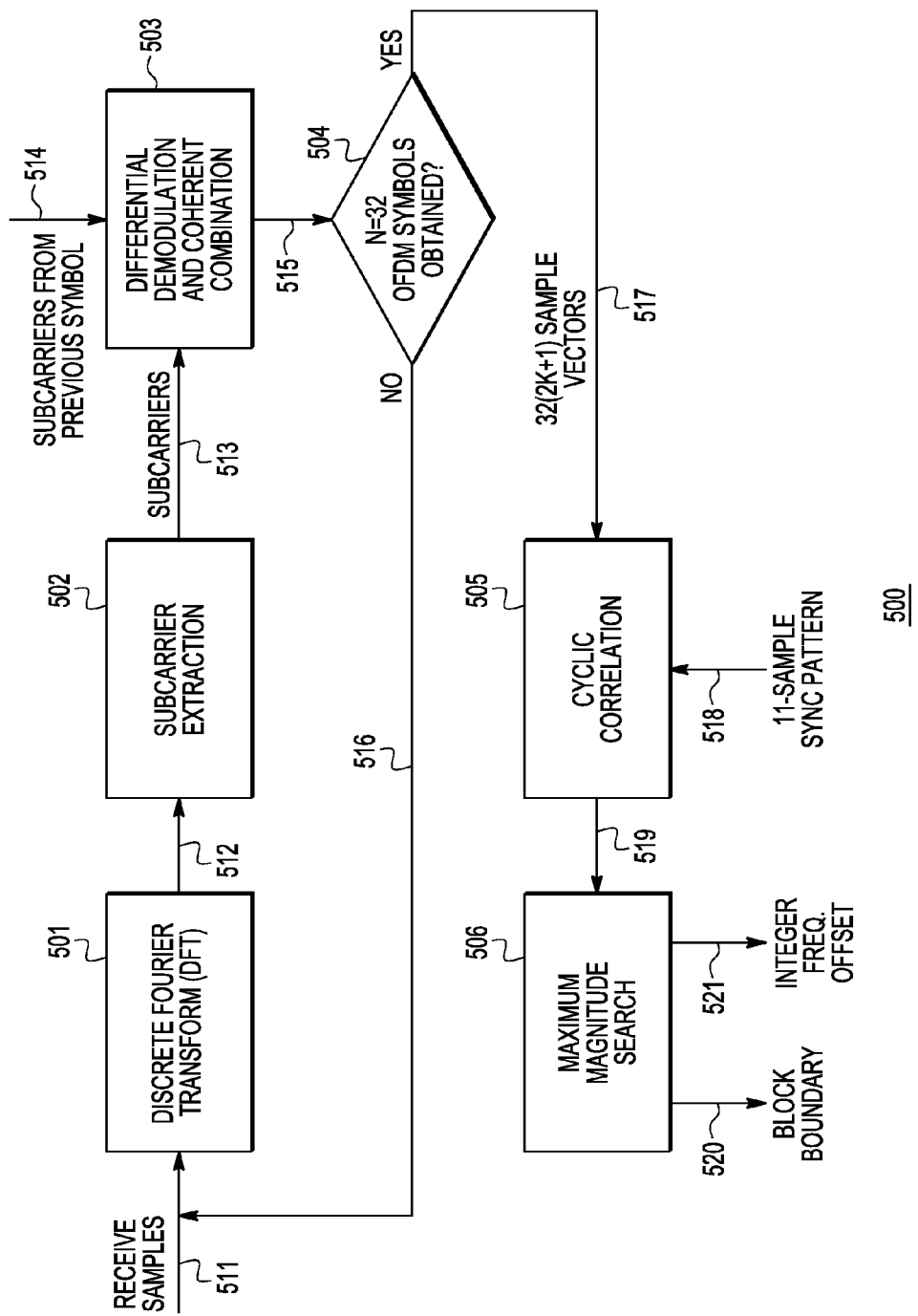
FIG. 5 is a flow diagram illustrating a method for block synchronization and integral frequency offset tuning in accordance with one embodiment.

FIG. 5 is a flow diagram illustrating a method for block synchronization and integral frequency offset tuning in accordance with one embodiment. Method 500 begins with received samples 511, in the time domain, upon which a discrete Fourier transform (DFT) is performed in block 501. In block 501, the received samples 511, in the time domain, are transformed into received samples 512, in the frequency domain, and provided to block 502. Subcarrier extraction is performed in block 502, and extracted subcarriers 513 are provided to block 503. In block 503, extracted subcarriers 513 and subcarriers 514 extracted from previous symbols are received, and differential demodulation and coherent combination is performed to obtain symbols 515, which are provided to decision block 504. In decision block 504, a decision is made as to whether or not a desired number of symbols have been obtained. For example, in a case where the pattern of symbols comprising control data sequences comprising synchronization bit patterns repeats every 32 symbols, a decision can be made at block 504 as to whether or not 32 OFDM symbols have been obtained via block 503. If not, the method returns to block 501 to receive additional ones of received samples 511.

If a desired number of symbols have been obtained, the method continues to block 505, providing, for example, 32(2k+1) sample vectors 517 to block 505, where k specifies the range of subcarrier indices over which the search is conducted (e.g., k=1 specifies one subcarrier index on each side of the nominal subcarrier index, k=2 specifies two subcarrier indices on each side of the nominal subcarrier index, etc.). The value of k can be determined in relation to the accuracy of a receiver's frequency reference, such as the receiver's oscillator or other source of frequency reference. For example, for a 10-part-per-million (10-ppm) high-definition (HD) radio receiver working at a carrier frequency of 100 MHz, a value of k=3 can be used appropriately, as can be determined by k≈1000 Hz/363 Hz≈3, where 363 Hz is the subcarrier spacing between adjacent subcarriers. In block 505, the sample vectors 517 (e.g., 32(2k+1) sample vectors) and a sample synchronization pattern 518 (e.g., an 11-sample synchronization pattern) are received, a cyclic correlation is performed, and the correlation results 519 are provided to block 506.

In block 506, a maximum magnitude search is performed, providing a determination of block boundary 520 and integral offset frequency 521 as output. With the determination of block boundary 520, a receiver can be synchronized with the data blocks being transmitted to it, for example, by processing a block of symbols with the symbol immediately following the determination of the block boundary 520 as the first symbol of the block and the symbol immediately preceding the next determination of a block boundary 520 as the last symbol of the block. With the determination of integral offset frequency 521, a receiver can be retuned, for example by providing it with a frequency offset value with which to adjust its subcarrier index numbering to be aligned in frequency with the subcarriers being transmitted to it.

Figure 6:
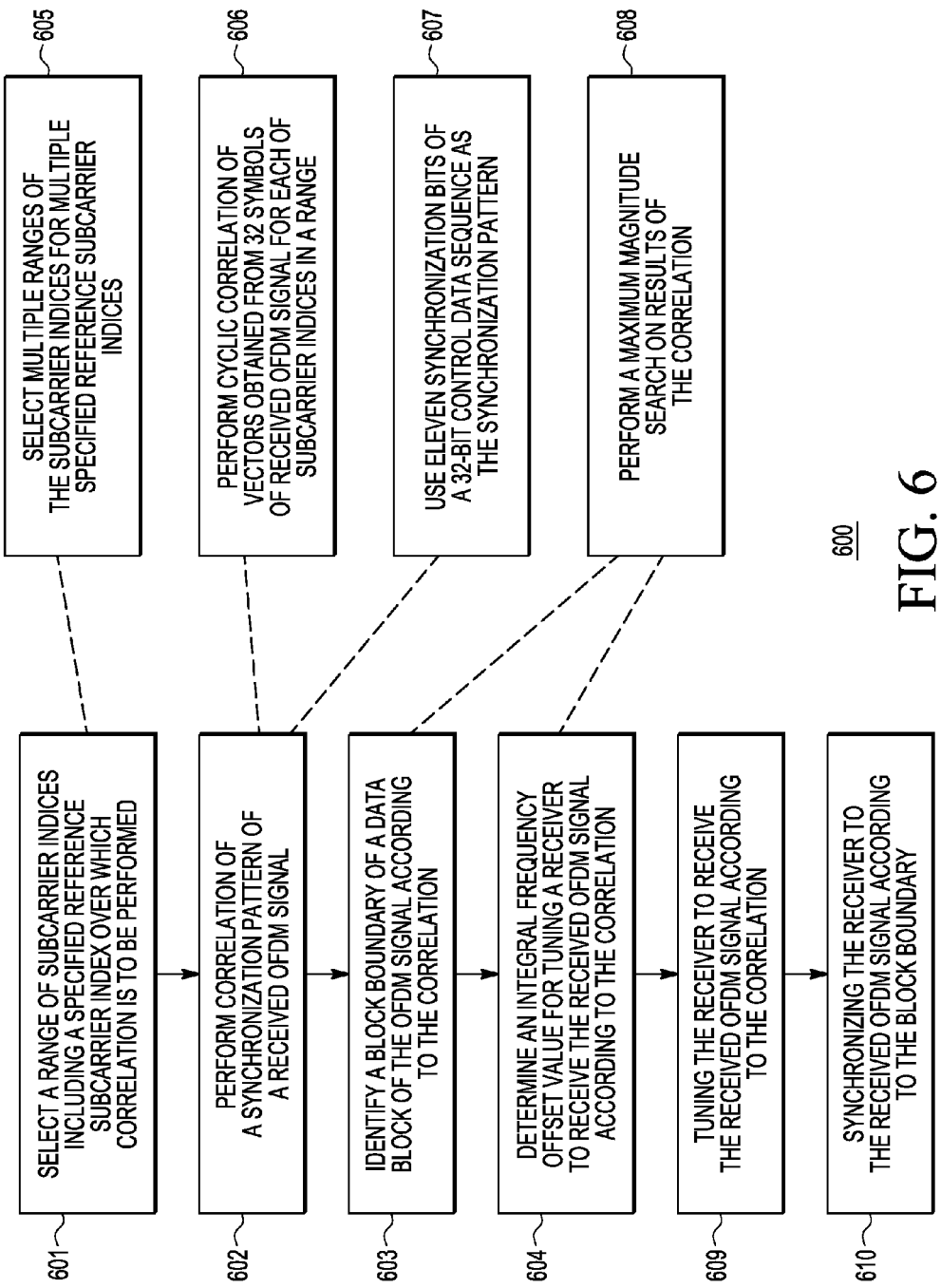
FIG. 6 is a flow diagram illustrating a method for identifying a block boundary and an integral frequency offset value in accordance with one embodiment.

FIG. 6 is a flow diagram illustrating a method for identifying a block boundary and an integral frequency offset value in accordance with one embodiment. Method 600 begins at block 601, where a range of subcarrier indices is selected including a specified reference subcarrier index over which correlation is to be performed. Block 601 can be performed by selecting multiple ranges of the subcarrier indices for multiple specified reference subcarrier indices, as shown in block 605. From block 601, the method continues to block 602, where correlation of a synchronization pattern of a received orthogonal-frequency-division-multiplexed (OFDM) signal is performed. Block 602 can be performed by performing cyclic correlation of vectors obtained from symbols (e.g., 32 symbols) of a received OFDM signal for each of a plurality of subcarrier indices in a range, as shown by block 606. Block 602 can be performed using synchronization bits (e.g., eleven synchronization bits) of a control data sequence (e.g., a 32-bit control data sequence) as the synchronization pattern, as shown in block 607.

From block 602, the method continues to block 603. In block 603, a block boundary of a data block of the OFDM signal is identified according to the correlation. Block 603 can be performed by performing a maximum magnitude search on correlation values (i.e., results) of the correlation, as shown in block 608. From block 603, the method continues to block 604. In block 604, an integral frequency offset value for tuning a receiver to receive the received OFDM signal is determined according to the correlation. Block 604 can be performed by performing a maximum magnitude search on results of the correlation, as shown in block 608.

From block 608, the method continues to block 609. In block 609, the receiver is tuned to receive the received OFDM signal according to the correlation. From block 609, the method continues to block 610. In block 610, the receiver is synchronized to the received OFDM signal according to the block boundary. By tuning the receiver according to the correlation and synchronizing the receiver according to the block boundary, proper reception of the received OFDM signal can occur.

Figure 7:
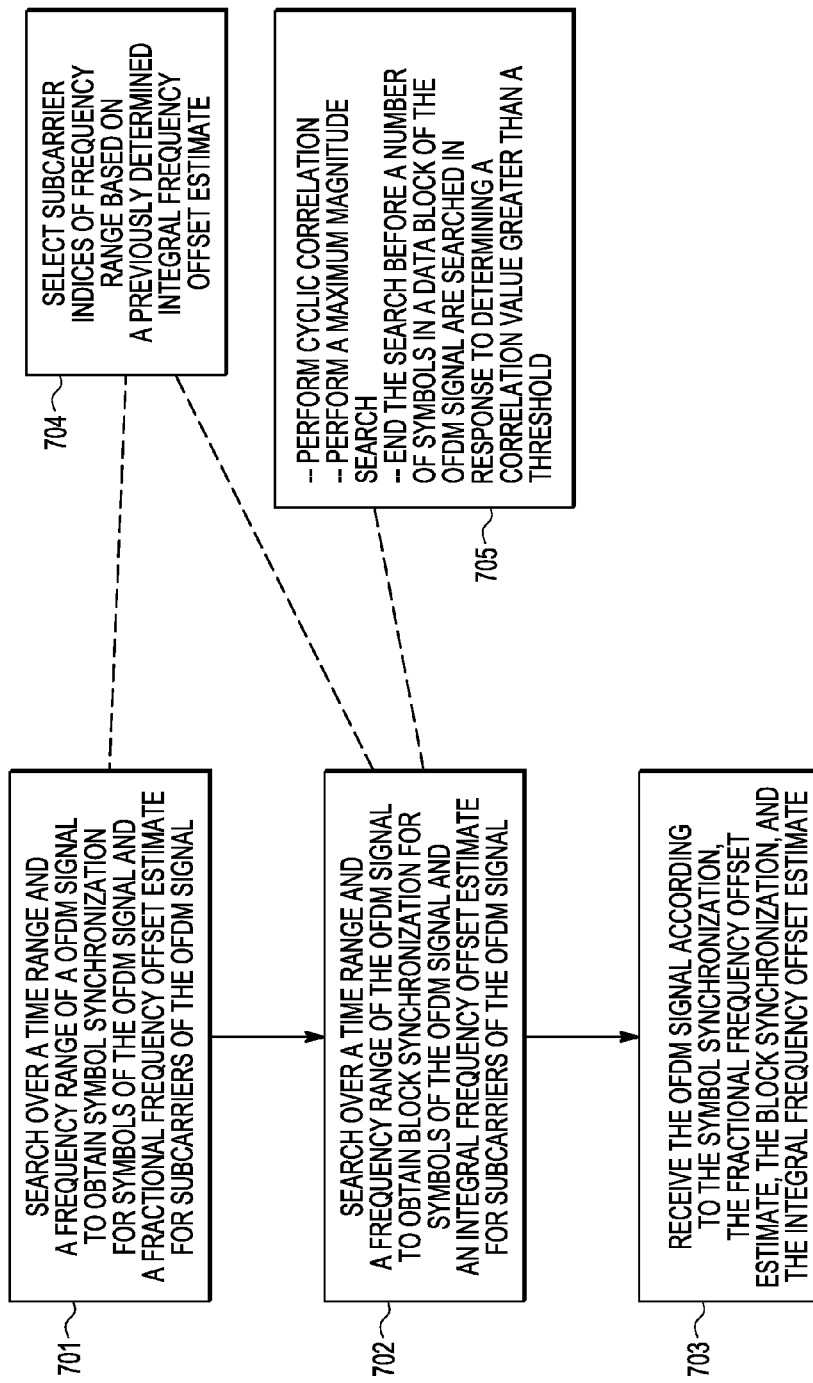
FIG. 7 is a flow diagram illustrating a method for receiving an OFDM signal with proper synchronization and tuning in accordance with one embodiment.

FIG. 7 is a flow diagram illustrating a method for receiving an OFDM signal with proper synchronization and tuning in accordance with one embodiment. Method 700 begins in block 701. In block 701, searching over a time range and a frequency range of an OFDM signal to obtain symbol synchronization for symbols of the OFDM signal and a fractional frequency offset estimate for subcarriers of the OFDM signal is performed. Symbol synchronization determines the beginning and end of each symbol interval of a modulated signal. The time range can include a number of symbols in a data block of the OFDM signal. The frequency range can include a plurality of subcarrier indices proximate to reference subcarrier indices of the OFDM signal. Block 701 can include selecting a plurality of subcarrier indices based on a previously determined integral frequency offset estimate, as shown in block 704. From block 701, the method continues to block 702. In block 702, searching over the time range and the frequency range of the OFDM signal to obtain block synchronization for symbols of the OFDM signal and an integral frequency offset estimate for subcarriers of the OFDM signal is performed. As shown in block 705, block 702 can be performed by performing one or more of a cyclic correlation and a maximum magnitude search, and the search can be concluded before a number of symbols in a data block of the OFDM signal are searched in response to determining a correlation value greater than a threshold. From block 702, the method continues to block 703. In block 703, the OFDM signal is received according to the symbol synchronization, the fractional frequency offset estimate, the block synchronization, and the integral frequency offset estimate.

In accordance with at least one embodiment, a receiver or method disclosed herein can be used for reception of a FDM signal, such as an OFDM signal. Examples of signals that can be received include digital broadcast radio signals, such as in-band on-channel (IBOC) digital broadcast radio signals (e.g., HD Radio); digital broadcast television (DTV) signals, such as Advanced Television Systems Committee (ATSC) signals and Digital Video Broadcast-Terrestrial (DVB-T) signals, the like, and combinations thereof. Parameters, such as the number of subcarriers, the frequencies of subcarriers, the frequency differences between subcarriers, the number of subcarriers extracted, the modulation used, the duration of symbols, the block size, the number of symbols per block, the like, and combinations thereof, can vary in accordance with various embodiments.

In accordance with at least one embodiment, a frequency offset value can be stored for a first iteration of determining the frequency offset value and used as a starting point for a second iteration of determining the frequency offset value. Thus, for example, a range of nominal subcarrier indices centered around a nominal subcarrier index identified according to a previously determined integral frequency offset value can be used as a starting point for subsequent determination of a revised integral frequency offset value. The revised integral frequency offset value may or may not be the same value as the previously determined integral frequency offset value depending on whether the frequency offset has not or has changed since the previous determination. The previously determined integral frequency offset value can be used unchanged from its original value or, for example, it can be scaled according to the frequencies of the signals to be received subsequently relative to the frequencies of the previously received signals. For example, the integral frequency offset value can be denominated in units of subcarrier index (i.e., representative of the frequency difference between consecutive subcarriers) and can be used unchanged for other received signal frequencies relatively near (e.g., in the same band) as the previously received signal. However, for example, for subcarriers having a similar spacing of adjacent subcarriers but in a band having, for example, approximately twice the frequency of a band of the previously received signal, the integral frequency offset value can be doubled to maintain a similar relationship to the frequencies of the received signal (e.g., on a part-per-million (ppm) or part-per-billion (ppb) basis) as the relationship of the previously determined integral frequency offset value to the previously received signal frequencies. If a fractional frequency offset value, in addition to the integral frequency offset value, is used for receiving a signal, the combination of the integral frequency offset value and the fractional frequency offset value can be scaled according to the frequencies of the received signal, and such scaling can be performed, for example, both for frequencies in the same band and frequencies in different bands.

In accordance with at least one embodiment, the range of nominal subcarrier indices over which the subcarrier extraction for the purpose of frequency offset determination is performed can be varied. As an example, a broader range of nominal subcarrier indices can be used for subcarrier extraction during a first iteration, and a narrower range can be used during a subsequent iteration. As a more specific example, the range can be reduced such that only the nominal subcarrier index found, during the previous iteration, to correspond to the desired actual subcarrier is extracted, based on an assumption that the frequency offset value from the last iteration is still valid. Referring back to FIG. 3, such a reduction in range results in the extraction of only the subcarrier index [+526], which is understood to denote the frequency of subcarrier [+527] based on a previously determined integral frequency offset value. Symbols from that sole subcarrier can be obtained until a desired number of symbols (e.g., the number of symbols in a block of symbols) have been obtained. As another example, the range can be reduced by r nominal subcarrier indices at each end of the range, such that $2(k-r)+1$ nominal subcarrier indices are included in the range. Thus, a condensed frequency space can be searched after a larger frequency space is initially searched.

In accordance with at least one embodiment, the range of nominal subcarrier indices over which the subcarrier extraction for the purpose of frequency offset determination is performed can be increased until a desired level of correlation is determined. For example, a block sync search over 32 consecutive symbols of only the previously determined nominal subcarrier index can be initially performed. If a correlation over those 32 symbols or a portion of those 32 symbols is found to exceed a pre-determined correlation threshold, the block synchronization corresponding to that correlation can be selected as the block synchronization to be used for reception. If not, the range of nominal subcarrier indices over which the subcarrier extraction for the purpose of frequency offset determination is to be performed can be extended, for example, to include one nominal subcarrier index below and one nominal subcarrier index above the previously determined nominal subcarrier index. If a correlation over those the symbols from the three nominal subcarrier indices of that range is found to exceed a pre-determined correlation threshold, the block synchronization and the frequency offset corresponding to that correlation can be selected as the block synchronization and the frequency offset to be used for reception. If not, the range of nominal subcarrier indices can be further extended.

In accordance with at least one embodiment, failure of a determined block synchronization value and a determined frequency offset value to provide proper reception, which can result, for example, from determination of an incorrect block synchronization value or an incorrect frequency offset value, can be identified during subsequent processing of the received signal, for example, by failure of a error detection code, such as a cyclic redundancy code (CRC). Upon detection of such a failure, the receiver can restart the method to determine the block synchronization and frequency offset value. As an example, the method can be restarted with a requirement for better correlation than the observed correlation that resulted in the failure.

In accordance with at least one embodiment, the number of symbol time slots over which symbols are obtained can be reduced if a correlation exceeding a high threshold is determined, for example, prior to having obtained symbols over a number of symbol time slots that constitute a block of symbols. If a correlation exceeding such a high threshold is not observed, the obtaining of the symbols can continue until the high threshold is exceeded or a number of symbols at least a great as the number of symbols in a block of symbols have been obtained.

While the range of selected nominal subcarrier indices have been described symmetrically about a specified nominal subcarrier index, in accordance with at least one embodiment, the range can be asymmetric with respect to the specified nominal subcarrier index. As an example, if a frequency reference, such as a quartz crystal oscillator, is expected to drift a particular direction in frequency in response to an increase in temperature, a range of nominal subcarrier indices over which a frequency offset determination is made after a period of operation of the receiver can be asymmetrically biased in the direction in which the frequency is expected to drift in response to an increase in temperature. As another example, if a frequency determination is made after a period when the receiver has been in a low power state, such as powered down state or a quiescent state, a range of nominal subcarrier indices over which a frequency offset determination is made can be biased away from the direction in which the frequency is expected to drift in response to an increase in temperature.

In accordance with one embodiment, a method in a receiver is provided, wherein the method includes performing correlation of a synchronization pattern to a received orthogonal-frequency-division-multiplexed (OFDM) signal, identifying a block boundary of a data block of the received OFDM signal according to the correlation, synchronizing the receiver to the received OFDM signal according to the block boundary, determining an integral frequency offset value, and tuning the receiver to receive the received OFDM signal according to the correlation. In accordance with one embodiment, the determining the integral frequency offset value includes performing a maximum magnitude search of correlation values of the correlation. In accordance with one embodiment, the identifying the block boundary of the data block of the received OFDM signal is performed using the maximum magnitude search of the correlation values of the correlation. In accordance with one embodiment, the method also includes selecting a range of subcarrier indices, including a specified reference subcarrier index over which the correlation is to be performed. In accordance with one embodiment, the tuning adjusts the receiver for a frequency difference between a nominal frequency of the specified reference subcarrier index and an actual frequency of a corresponding reference subcarrier of the received OFDM signal. In accordance with one embodiment, the correlation is a cyclic correlation. In accordance with one embodiment, the selecting the range of subcarrier indices includes selecting multiple ranges of the subcarrier indices for multiple specified reference subcarrier indices. In accordance with one embodiment, the synchronization pattern consists of eleven synchronization bits of a 32-bit control data sequence.

In accordance with one embodiment, a receiver includes an analog-to-digital converter (ADC), a correlation module coupled to the ADC, a frequency correction module, and a block synchronization module. The correlation module is connected to the ADC. The frequency correction module is connected to the correlation module. The block synchronization module is connected to the correlation module. The correlation module is configured to perform correlation of a synchronization pattern to a received orthogonal-frequency-division-multiplexed (OFDM) signal. The frequency correction module is configured to determine an integral frequency offset value for tuning the receiver to receive the received OFDM signal according to the correlation. The block synchronization module is configured to identify a block boundary of a data block of the received OFDM signal for synchronizing the receiver with the received OFDM signal according to the correlation. In accordance with one embodiment, the correlation module is further configured to perform a maximum magnitude search of the correlation values of the correlation to determine the integral frequency offset value. In accordance with one embodiment, the block synchronization module is further configured to identify the block boundary of the data block of the received OFDM signal according to the maximum magnitude search of the correlation values of the correlation. In accordance with one embodiment, the correlation module is further configured to select a range of subcarrier indices including a specified reference subcarrier index over which the correlation is to be performed. In accordance with one embodiment, the correlation is a cyclic correlation. In accordance with one embodiment, to select the range of subcarrier indices, the correlation module is configured to select multiple ranges of the subcarrier indices for multiple specified reference subcarrier indices. In accordance with one embodiment, the synchronization pattern consists of eleven synchronization bits of a 32-bit control data sequence.

In accordance with one embodiment, a method in a receiver is provided. The method includes searching over a time range and a frequency range of a OFDM signal to obtain symbol synchronization for symbols of the OFDM signal and a fractional frequency offset estimate for subcarriers of the OFDM signal, searching over the time range and the frequency range of the OFDM signal to obtain block synchronization for symbols of the OFDM signal and an integral frequency offset estimate for subcarriers of the OFDM signal, and receiving the OFDM signal according to the symbol synchronization, the fractional frequency offset estimate, the block synchronization, and the integral frequency offset estimate. In accordance with one embodiment, the searching over the time range and the frequency range of the OFDM signal to obtain the block synchronization and the integral frequency offset estimate is performed using cyclic correlation. In accordance with one embodiment, the searching over the time range and the frequency range of the OFDM signal to obtain the block synchronization and the integral frequency offset estimate is performed using a maximum magnitude search. In accordance with one embodiment, the time range includes a number of symbols in a data block of the OFDM signal. In accordance with one embodiment, the frequency range includes a plurality of subcarrier indices proximate to reference subcarrier indices of the OFDM signal. In accordance with one embodiment, the plurality of subcarrier indices are selected based on a previously determined integral frequency offset estimate. In accordance with one embodiment, the searching over the time range and the frequency range of the OFDM signal to obtain block synchronization for symbols of the OFDM signal ends before a number of symbols in a data block of the OFDM signal are searched in response to determining a correlation value greater than a threshold.

What is claimed is:

1. A method in a receiver, the method comprising:
 performing correlation of a synchronization pattern to a received orthogonal-frequency-division-multiplexed (OFDM) signal;
 identifying a block boundary of a data block of the received OFDM signal according to the correlation;
 synchronizing the receiver to the received OFDM signal according to the block boundary;
 determining an integral frequency offset value; and
 tuning the receiver to receive the received OFDM signal according to the correlation.

2. The method of claim 1 wherein the determining the integral frequency offset value comprises:
 performing a maximum magnitude search of correlation values of the correlation.

3. The method of claim 2 wherein the identifying the block boundary of the data block of the received OFDM signal is performed using the maximum magnitude search of the correlation values of the correlation.

4. The method of claim 1 further comprising:
 selecting a range of subcarrier indices, including a specified reference subcarrier index over which the correlation is to be performed, wherein the tuning adjusts the receiver for a frequency difference between a nominal frequency of the specified reference subcarrier index and an actual frequency of a corresponding reference subcarrier of the received OFDM signal.

5. The method of claim 4 wherein the correlation is a cyclic correlation.

6. The method of claim 4 wherein the selecting the range of subcarrier indices comprises:

selecting multiple ranges of the subcarrier indices for multiple specified reference subcarrier indices.

7. The method of claim 1 wherein the synchronization pattern consists of eleven synchronization bits of a 32-bit control data sequence.

8. A receiver comprising:
an analog-to-digital converter (ADC);
a correlation module coupled to the ADC, the correlation module configured to perform correlation of a synchronization pattern to a received orthogonal-frequency-division-multiplexed (OFDM) signal
a frequency correction module coupled to the correlation module, the frequency correction module configured to determine an integral frequency offset value for tuning the receiver to receive the received OFDM signal according to the correlation; and
a block synchronization module coupled to the correlation module, the block synchronization module configured to identify a block boundary of a data block of the received OFDM signal for synchronizing the receiver with the received OFDM signal according to the correlation.

9. The receiver of claim 8 wherein the correlation module is further configured to perform a maximum magnitude search of the correlation values of the correlation to determine the integral frequency offset value.

10. The receiver of claim 9 wherein the block synchronization module is further configured to identify the block boundary of the data block of the received OFDM signal according to the maximum magnitude search of the correlation values of the correlation.

11. The receiver of claim 8 wherein the correlation module is further configured to select a range of subcarrier indices including a specified reference subcarrier index over which the correlation is to be performed.

12. The receiver of claim 11 wherein the correlation is a cyclic correlation.

13. The receiver of claim 11 wherein, to select the range of subcarrier indices, the correlation module is configured to select multiple ranges of the subcarrier indices for multiple specified reference subcarrier indices.

14. The receiver of claim 8 wherein the synchronization pattern consists of eleven synchronization bits of a 32-bit control data sequence.

15. A method in a receiver, the method comprising:
searching over a time range and a frequency range of a OFDM signal to obtain symbol synchronization for symbols of the OFDM signal and a fractional frequency offset estimate for subcarriers of the OFDM signal;
searching over the time range and the frequency range of the OFDM signal to obtain block synchronization for symbols of the OFDM signal and an integral frequency offset estimate for subcarriers of the OFDM signal; and
receiving the OFDM signal according to the symbol synchronization, the fractional frequency offset estimate, the block synchronization, and the integral frequency offset estimate.

16. The method of claim 15 wherein the searching over the time range and the frequency range of the OFDM signal to obtain the block synchronization and the integral frequency offset estimate is performed using cyclic correlation.

17. The method of claim 16 wherein the searching over the time range and the frequency range of the OFDM signal to obtain the block synchronization and the integral frequency offset estimate is performed using a maximum magnitude search.

18. The method of claim 15 wherein the time range comprises a number of symbols in a data block of the OFDM signal, and the frequency range comprises a plurality of subcarrier indices proximate to reference subcarrier indices of the OFDM signal.

19. The method of claim 18 wherein the plurality of subcarrier indices are selected based on a previously determined integral frequency offset estimate.

20. The method of claim 15 wherein the searching over the time range and the frequency range of the OFDM signal to obtain block synchronization for symbols of the OFDM signal ends before a number of symbols in a data block of the OFDM signal are searched in response to determining a correlation value greater than a threshold.

\* \* \* \* \*